(12) United States Patent
Aberegg et al.

(10) Patent No.: US 6,551,001 B2
(45) Date of Patent: Apr. 22, 2003

(54) CLEANING DEVICE WITH A TRIGGER-ACTUATED SPRAY CANISTER

(75) Inventors: Dale Aberegg, Mount Vernon, OH (US); Cathal Fahy, Columbus, OH (US); Tracey A. Frosch, Racine, WI (US); Steven A. Zach, Racine, WI (US); Brian Linstedt, Ostrander, OH (US)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 09/951,632

(22) Filed: Sep. 14, 2001

(65) Prior Publication Data

US 2003/0053845 A1 Mar. 20, 2003

(51) Int. Cl.⁷ ................................................ A46B 5/02
(52) U.S. Cl. ....................... 401/190; 401/138; 401/140; 222/608; 239/578
(58) Field of Search ................................ 401/138, 137, 401/140, 190; 222/608; 239/578, 754, 150

(56) References Cited

U.S. PATENT DOCUMENTS

| 1,021,708 A | 3/1912 | Schaeneman |
| 1,171,000 A | 2/1916 | Skillman |
| 2,187,671 A | 1/1940 | Suddarth ........................ 91/39 |
| 2,262,334 A | 11/1941 | Rugaard ........................ 91/25 |
| 2,566,429 A | 9/1951 | Schulman .................... 222/501 |
| 2,575,124 A | 11/1951 | Pollitt ........................ 222/162 |
| 3,081,481 A | 3/1963 | Nohl et al. .................... 15/543 |
| 3,114,922 A | 12/1963 | Ballantyne ...................... 15/50 |
| 3,143,254 A | 8/1964 | Vanderhyde ................. 222/394 |
| 3,149,761 A | 9/1964 | Harris et al. ................. 222/394 |
| 3,185,350 A | 5/1965 | Abplanalp et al. ........... 222/182 |
| 3,254,804 A | 6/1966 | Grant ........................... 222/185 |
| 3,317,091 A | 5/1967 | Focht .................... 222/402.13 |

(List continued on next page.)

FOREIGN PATENT DOCUMENTS

WO          WO 00/27271          5/2000

Primary Examiner—David J. Walczak

(57) ABSTRACT

A cleaning device includes a cleaning head, a housing connected to the cleaning head and configured to retain a spray canister, an actuator rod configured to contact an overcap attached to the canister, and a pivot link pivotally attached to the housing about a pivot point. The pivot point is positioned to allow contact between the actuator rod and the pivot link. In addition, a shaft assembly including a core is slidably disposed within the shaft assembly, with the slidable core being adapted to rotate the pivot link about the pivot point, and a handle is attached to the shaft assembly including a trigger mechanism. The trigger mechanism is adapted to move the slidable core toward the housing, which then pivots the pivot link, ultimately bringing the actuator rod into contact with the cap and causing a dispensing of contents of the canister.

25 Claims, 9 Drawing Sheets

U.S. PATENT DOCUMENTS

| | | | | |
|---|---|---|---|---|
| 3,329,320 A | | 7/1967 | Braun | 222/402.13 |
| 3,457,016 A | | 7/1969 | Gotberg | 401/131 |
| 3,473,700 A | | 10/1969 | Batistelli | 222/174 |
| 3,549,054 A | | 12/1970 | Etter | 222/180 |
| 3,679,319 A | | 7/1972 | Munchel et al. | 401/138 |
| 3,754,689 A | | 8/1973 | Blank | 222/402.11 |
| 3,794,217 A | | 2/1974 | Munchel | 222/174 |
| 3,856,209 A | * | 12/1974 | Hickson | 239/532 |
| 3,871,557 A | | 3/1975 | Smrt | 222/162 |
| 3,885,717 A | | 5/1975 | Ewald | 222/402.11 |
| 3,887,115 A | | 6/1975 | Petterson | 222/402.13 |
| 3,973,853 A | * | 8/1976 | Myers | 401/190 |
| 4,013,231 A | | 3/1977 | Van Veldhoven | 239/579 |
| 4,013,369 A | | 3/1977 | Turek | 401/139 |
| 4,017,009 A | | 4/1977 | Ewald et al. | 222/402.11 |
| 4,024,995 A | | 5/1977 | Landen et al. | 222/402.11 |
| 4,068,782 A | | 1/1978 | Van der Heijden | 222/402.13 |
| 4,089,440 A | | 5/1978 | Lee | 222/174 |
| 4,092,000 A | | 5/1978 | Offutt, III | 239/532 |
| 4,111,338 A | | 9/1978 | Cheng et al. | 222/180 |
| 4,262,821 A | | 4/1981 | Smrt | 222/162 |
| 4,277,004 A | | 7/1981 | Barlics | 222/402.14 |
| 4,328,911 A | | 5/1982 | Knickerbocker | 222/182 |
| 4,354,621 A | | 10/1982 | Knickerbocker | 222/47 |
| 4,378,081 A | | 3/1983 | van Lit | 222/402.13 |
| 4,416,398 A | | 11/1983 | Knickerbocker | 222/402.13 |
| 4,426,025 A | | 1/1984 | Knickerbocker | 222/182 |
| 4,426,026 A | | 1/1984 | Knickerbocker | 222/402.13 |
| 4,432,472 A | | 2/1984 | Lamm | 222/174 |
| 4,572,410 A | | 2/1986 | Brunet | 222/402.11 |
| 4,579,258 A | | 4/1986 | Brown et al. | 222/323 |
| 4,598,664 A | | 7/1986 | Hamlin | 118/325 |
| 4,726,519 A | | 2/1988 | Muoio | 239/49 |
| 4,789,084 A | | 12/1988 | Yoshitomi | 222/174 |
| 4,802,782 A | | 2/1989 | Scalf | 401/138 |
| 4,833,752 A | | 5/1989 | Merrick | 15/322 |
| 4,886,191 A | | 12/1989 | Yoshitomi | 222/174 |
| 4,971,471 A | | 11/1990 | Sloan | 401/203 |
| D323,117 S | | 1/1992 | Demarest | D9/448 |
| 5,263,616 A | | 11/1993 | Abplanalp | 222/402.13 |
| 5,364,198 A | | 11/1994 | Skenderi | 401/138 |
| 5,411,184 A | | 5/1995 | Smrt | 222/402.13 |
| 5,503,303 A | | 4/1996 | LaWare et al. | 222/153.12 |
| 5,641,095 A | | 6/1997 | de Laforcade | 222/182 |
| 5,735,464 A | | 4/1998 | Darrach, III | 239/288.5 |
| 5,769,324 A | * | 6/1998 | Lenhart | 401/190 |
| 5,779,155 A | | 7/1998 | Schennum et al. | 239/333 |
| D396,638 S | | 8/1998 | Demarest | D9/448 |
| 5,791,524 A | | 8/1998 | Demarest | 222/153.06 |
| 5,819,985 A | | 10/1998 | Brody | 222/153.09 |
| 5,865,551 A | | 2/1999 | Lalli et al. | 401/139 |
| D406,763 S | | 3/1999 | Watkins et al. | D9/448 |
| 5,888,006 A | | 3/1999 | Ping et al. | 401/137 |
| D411,955 S | | 7/1999 | Richiger | D9/448 |
| 5,960,508 A | | 10/1999 | Holt et al. | 15/228 |
| 5,988,920 A | | 11/1999 | Kunkler et al. | 401/138 |
| 6,000,088 A | | 12/1999 | Wright et al. | 15/119.2 |
| 6,003,191 A | | 12/1999 | Sherry et al. | 15/228 |
| 6,045,622 A | | 4/2000 | Holt et al. | 134/6 |
| 6,048,123 A | | 4/2000 | Holt et al. | 401/138 |
| D428,226 S | | 7/2000 | Kunkler | D32/45 |
| 6,101,661 A | | 8/2000 | Policicchio et al. | 15/228 |
| 6,101,671 A | | 8/2000 | Wright et al. | 15/365 |
| 6,102,305 A | | 8/2000 | Chapman et al. | 239/150 |
| D436,038 S | | 1/2001 | Ruiz de Gopegui | D9/448 |
| 6,390,336 B1 | * | 5/2002 | Orozco | 222/162 |
| 6,435,129 B1 | * | 8/2002 | McDonald et al. | 116/211 |

* cited by examiner

CLEANING DEVICE WITH A TRIGGER-ACTUATED SPRAY CANISTER

BACKGROUND OF THE INVENTION

1. Field of the Invention

The invention relates to a cleaning device, and more particularly, to a cleaning device, such as a mop, with a trigger-actuated spray canister attached thereto.

2. Description of the Related Art

The cleaning of houses, office buildings, apartments, and many other structures often proves challenging due to such things as high ceilings, furniture placed within rooms, and many other structural features. The physical dimensions of various furniture often limit one's ability to clean thereunder, ceiling corners are often just out of reach, and bending or crouching to floors may strain one's back. However, as difficult as people may find such cleaning, most are likely to prefer ridding their living and working areas of the dust, spider webs, debris, and the like plaguing that environment.

Besides the complications imposed by an area's physical characteristics, people engaging in cleaning operations may be burdened by various chemicals found in even common household cleaning liquids. Many cleaners, whether purchased in a local grocery store or intended for industrial use, may cause skin or eye irritation, and may even be toxic. Moreover, since some cleaning spray canisters require direct operation by a user's finger, the risk of the user's skin or eyes coming in contact with the potentially dangerous chemicals is increased. As such, cleaning operations should be performed in ways that minimize one's contact with those cleaning fluids.

Further, especially to ensure the safety of infants and young children, cleaning fluids must be contained in such a way so as to prevent accidental discharge. If a child picks up a spray canister, for example, any cap on that canister must minimize the probability of that child coming in contact with the chemicals therein, yet allow an intended user to still apply those chemicals with relative ease during cleaning operations. Thus, a need exists for a safe, easy-to-use cleaning device that allows for the cleaning of hard-to-reach areas, including the directed application of various cleaning fluids to aid in that cleaning, but which minimizes the chance of injury to unintended users of the device.

Several attempts have been made to make cleaning operations easier. For example, U.S. Pat. No. 3,794,217 to Munchel discloses an elevated spraying device and U.S. Pat. No. 3,679,319 to Munchel, et al., discloses a cleaning attachment for that elevated spray device. Each of U.S. Pat. Nos. 4,886,191 and 4,789,084 to Yoshitomi discloses a tool for assisting spray work at a high position. Finally, U.S. Pat. No. 5,779,155 to Schennum, et al., discloses a mop using a manually actuated, decoupled liquid delivery system for delivering a predetermined volume of liquid to a working surface.

However, none of the devices discussed above provides for an all-in-one, safe, easy-to-use, cleaning apparatus that allows for the cleaning of hard-to-reach areas, and provides for directed and focused application of various cleaning fluids to aid in that cleaning. Moreover, none of those devices minimizes a risk of injury to unintended users of them, by, for example, including features intended to prevent unknowing or accidental discharge of cleaning fluids.

SUMMARY OF THE INVENTION

This invention addresses the foregoing needs in the art by providing a cleaning device with a trigger-actuated spray canister having an overcap attached thereto. The cleaning device includes a mop head, a housing pivotally attached to the mop head for holding the canister, a shaft assembly attached to the housing, and a handle having a trigger mechanism therein attached to a distal end of the shaft assembly.

In a first aspect of this invention, a cleaning device for use with a spray canister having a cap attached thereto includes a mop head, a housing connected to the mop head for retaining the spray canister, an actuator rod for contacting the cap, and a pivot link pivotally attached to the housing about a pivot point. The pivot link includes a first end and a second end separated by the pivot point therebetween, with the pivot point being positioned to allow contact between the actuator rod and the first end of the pivot link. A shaft assembly includes a core slidably disposed within the shaft assembly and adapted to contact the second end of the pivot link and rotate the pivot link about the pivot point. A handle is attached to the shaft assembly and includes a trigger. The trigger is adapted to slide the slidable core, which in turn pivots the pivot link, bringing the actuator rod into contact with the cap.

In another aspect, the housing comprises a front panel and a back panel defining a space therebetween. The actuator rod and the pivot link are disposed within the space defined by the front panel and the back panel.

In yet another aspect of the invention, the shaft assembly comprises a lower hollow shaft, an upper hollow shaft attached to the lower hollow shaft, a lower slidable core disposed within the lower hollow shaft and an upper slidable core disposed within the upper hollow shaft. The handle is attached to the upper hollow shaft, and the lower hollow shaft is attached to the housing.

In another aspect of this invention, a cleaning device for use with a spray canister having a cap attached thereto includes a mop head for holding a cleaning device, a housing configured to retain the spray canister, an actuator rod configured to apply a force to the cap, and means for reversing a direction of an applied force. A shaft assembly includes a slidable inner core for applying a force, and an actuator actuates the inner core. The means for reversing a direction of an applied force is disposed between the actuator rod and the actuator and causes the actuator rod to apply force in a direction substantially opposite to the force applied by the inner core.

In another aspect of this invention, a cleaning device for use with a spray canister having a valve stem includes a mop head, a housing connected to the mop head for retaining the spray canister, and a cap attached to the spray canister. The cap includes a cylindrical wall, a lever arm hingedly attached to the cylindrical wall, and a nozzle disposed within the lever arm. The nozzle includes a stem socket adapted to receive the valve stem of the spray canister and adapted to provide a fan-shaped spray. Additional features include an actuator rod for contacting the cap, a pivot link pivotally attached to the housing about a pivot point, with the pivot point being positioned to allow contact between the actuator rod and the pivot link, and a shaft assembly including a core slidably disposed within the shaft assembly, with the slidable core adapted to rotate the pivot link about the pivot point. A handle is attached to the shaft assembly and includes a trigger. The trigger is adapted to slide the slidable core, which in turn pivots the pivot link, bringing the actuator rod into contact with the cap.

DETAILED DESCRIPTION OF THE PREFERRED EMBODIMENT

In a preferred embodiment, the invention comprises a mop head, a housing pivotally attached to the mop head that holds a canister, a shaft assembly affixed to the housing, and a handle having a trigger affixed to the distal end of the shaft assembly. These components are arranged so that when a user pulls the trigger, the contents of the canister are discharged in a predetermined pattern onto a surface, such as a floor.

Figure 1:
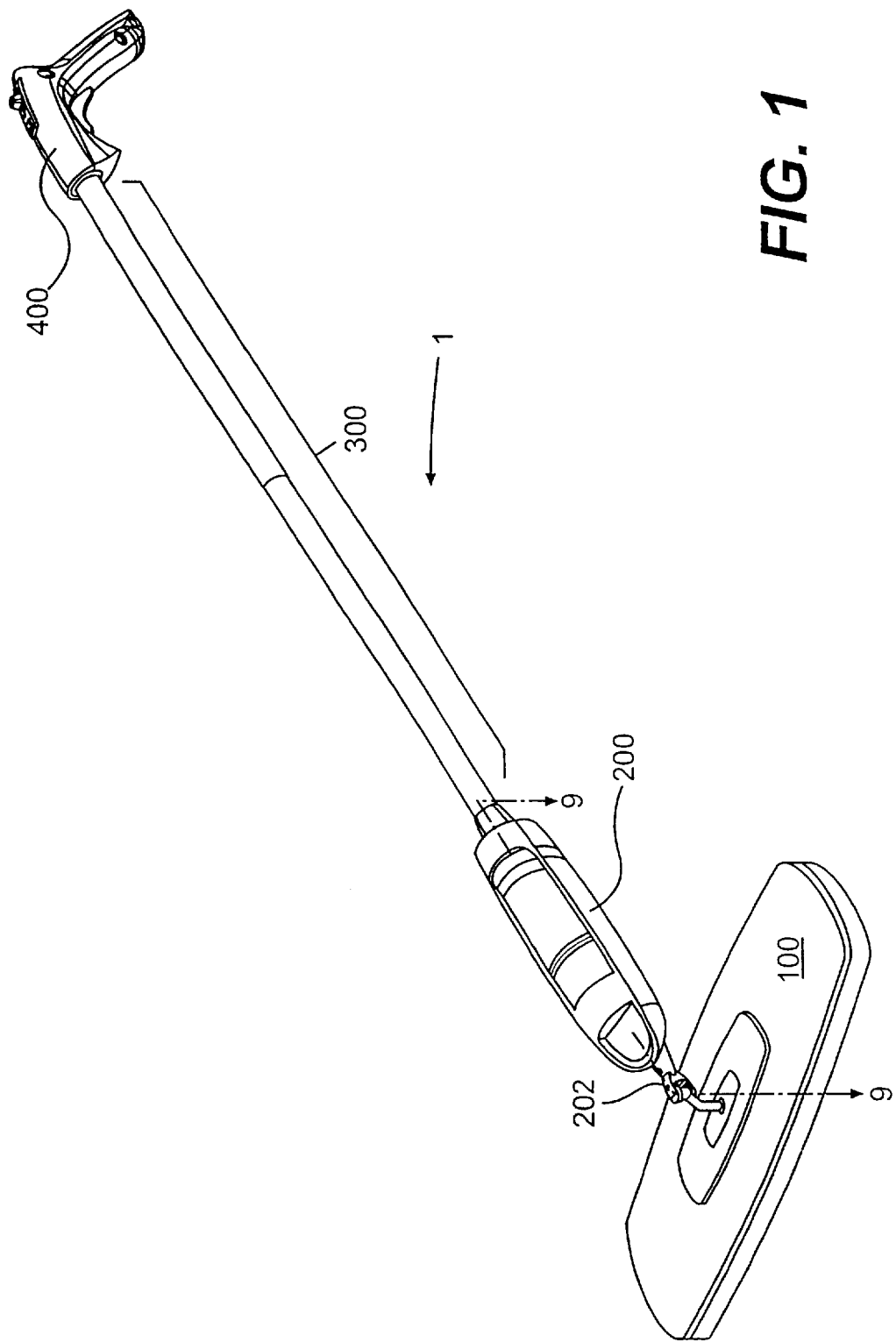
FIG. 1 shows a perspective view of a mop having a trigger-actuated spray canister according to this invention.
Figure 2:
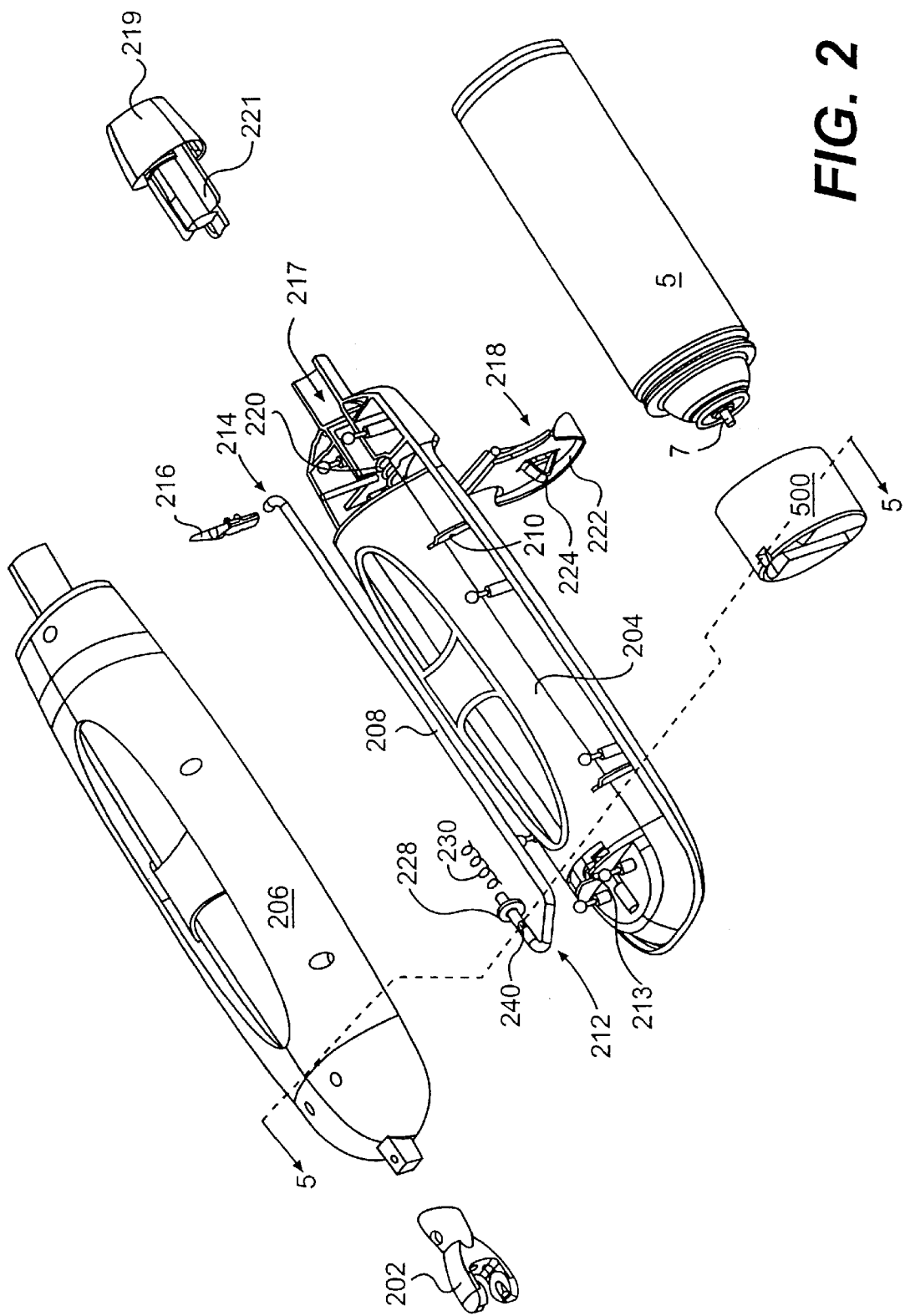
FIG. 2 shows an exploded perspective view of a housing for use with this invention.

FIG. 1 shows the invention according to a preferred embodiment. A trigger-actuated mop 1 comprises a mop head 100, a housing 200, a shaft assembly 300, and a handle 400. The mop head 100 holds a cleaning device such as, by way of non-limiting example, a sponge or cloth. The housing 200 connects to the mop head 100 by way of a U-shaped hinge 202, which engages a protrusion and a ball joint on the mop head 100. As shown in FIG. 2, the housing 200 is comprised of a front panel 204 and a rear panel 206 held together preferably by screws (not shown). Each of the panels 204, 206 includes a half-cylinder at its top (or proximal end), so that when the two panels 204, 206 are joined, a guide hole 217 results. However, the half cylinders do not meet, leaving a slot in the guide hole 217. A collar 219 slides into the guide hole 217 and two fins 221 of the collar 219 slide into the slots.

Preferably, the collar 219 and panels 204, 206 are joined together by screws. Other means of joining the panels and collar are also possible, such as adhesive, plastic fasteners, and the like. Moreover, the housing 200 may be joined to the mop head 100 by a variety of means, including but not limited to a ball joint, a multi-axis hinge joint, a single-axis hinge joint, a fixed connection, a flexible member, or the like.

The panels 204, 206 define a space into which an actuator rod 208 is slidably mounted. The actuator rod 208 is preferably slidably supported on two protrusions 210, but more or fewer than two may also be provided. Also, an actuator rod guiding portion (not shown), such as a groove, may be formed in one or more of the protrusions to aid in guiding the actuator rod 208 during its movement. The bottom end 212 of the actuator rod 208 is bent in a J-shape and includes a flattened portion 240, which supports a washer 228, while the top end 214 is bent at an angle, preferably a right angle, to contact a pivot link 216. The flattened portion 240 of the actuator rod 208 acts as a stop for the washer 228. That is, the washer 228 may only slide onto the actuator rod 208 up to the flattened portion 240. Of course, other stops may be used to position the washer 228 such as, by way of non-limiting examples, a dimple or bead formed on the actuator rod 208, or a reduced cross-section portion on the actuator rod 208 used in conjunction with a washer having a cross-section so as to mate with that reduced cross-section of the actuator rod 208. The bottom end 212 of the actuator rod 208 protrudes through an aperture 213 in the front panel 204 to contact an overcap 500 on a canister 5, which is preferably a spray canister such as, for example, of the aerosol type. The washer 228 acts as a base for a spring 230, which biases the actuator rod 208 downwards, away from the overcap 500.

Figure 3:
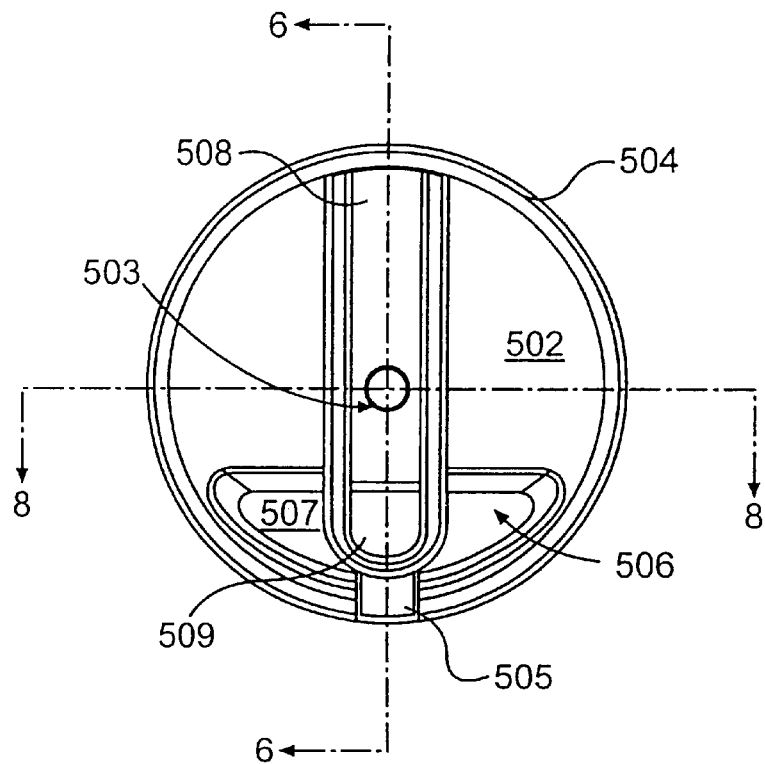
FIG. 3 shows a top plan view of an overcap of this invention.

FIG. 3 shows the overcap 500, which generally comprises a top surface 502, a nozzle 503, a cylindrical wall 504 depending from the top surface 502, a lever arm 508 and an actuator port 505. The actuator port 505 is adapted to receive a terminal end of the bottom end 212 of the actuator rod 208, so that the actuator rod 208 can contact the lever arm 508 at a pad 509.

Figure 5:
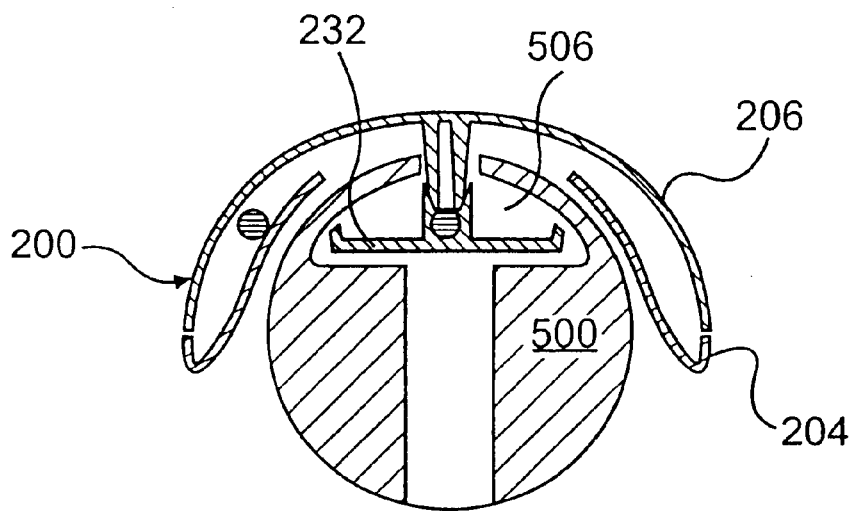
FIG. 5 shows a sectional view, in assembled form, taken along the line 5—5 in FIG. 2 when the overcap is placed in the housing.

FIG. 3 further shows the top surface 502 including a D-shaped recess 506. The D-shaped recess 506 ensures that the overcap 500 is always correctly oriented in the housing 200. As shown in FIG. 5, the housing 200 includes an aligning protrusion 232 for mating with, or receiving thereover, the walls of the D-shaped recess 506. In this way, the orientation of the overcap 500 is assured. Of course, the D-shaped recess 506 and the aligning protrusion 232 may take on a variety of shapes, and need not be exactly as illustrated. For example, a plurality of holes and posts may be used.

Figure 4:
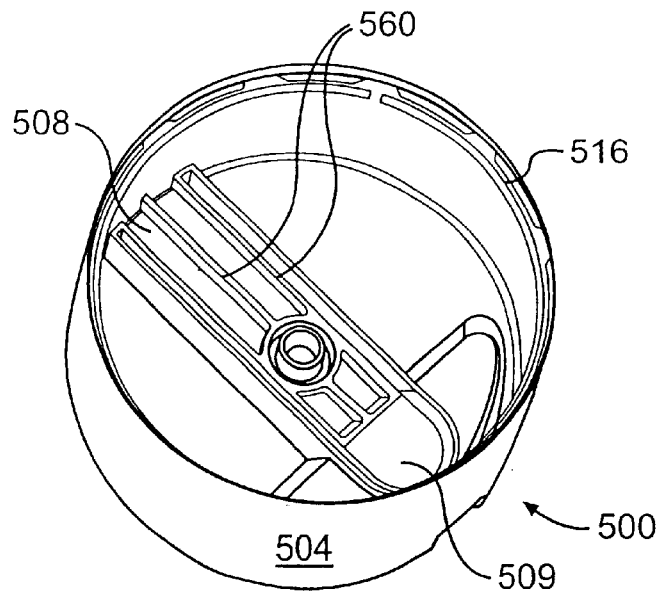
FIG. 4 shows a perspective view of an underside of the overcap according to this invention.
Figure 6:
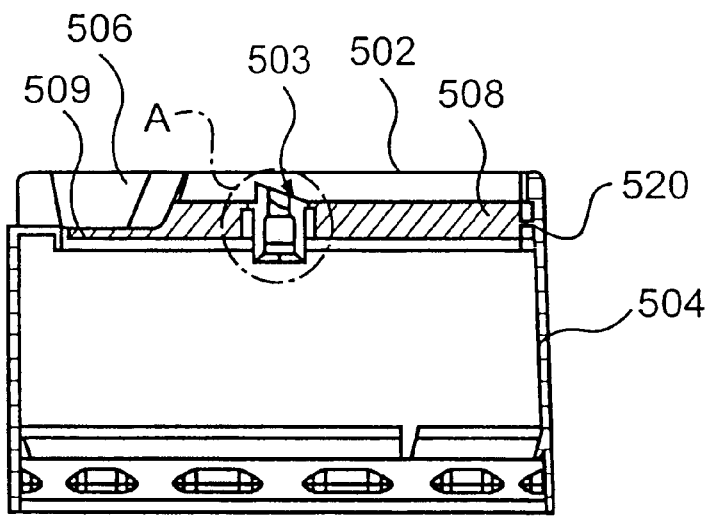
FIG. 6 shows a sectional view along the line 6—6 in FIG. 3.

As shown in FIG. 6, the lever arm 508 substantially traverses the diameter of the top surface 502, and is attached to the cylindrical wall 504 at a pivot point 520, which is positioned at an end opposite from the D-shaped recess 506. The pivoting lever arm 508 is separated from the top surface 502 and the D-shaped recess 506. As shown in FIGS. 3 and 4, the lever arm 508 terminates in the D-shaped recess 506, and is not connected to a floor 507 of the D-shaped recess 506. As such, the pivoting lever arm 508 is free to move out of the plane of the floor 507 of the D-shaped recess 506. A thickness of the lever arm 508 is thinned at the pivot point 520, as shown in FIG. 6, to reduce the force required to pivot the lever arm 508 about the pivot point 520.

Preferably, the lever arm 508 is disposed below the top surface 502 to minimize the risk of unknowing or accidental movement of the lever arm 508, but it may be on the same level as or above the top surface as well. In addition, the lever arm 508 preferably has ribs 560 on its underside to increase its rigidity, as shown in FIG. 4.

As shown in FIG. 4, the interior surface of the cylindrical wall 504 has a plurality of ribs 516 at its base. These ribs 516 engage a rim on the canister 5, holding the overcap 500 securely to the canister 5. Of course, alternative means to secure the overcap 500 to the canister 5 may be used, such as adhesive, or even integrally forming the overcap 500 with the canister 5.

Viewing the overcap 500 as depicted in FIG. 3, it is clear that one of the advantages of the overcap 500 is that it cannot be easily actuated by children. Even if a child could remove the canister 5 from the housing 200, the child would have difficulty pressing on the lever arm 508 in an unknowing attempt to cause the canister 5 to expel its contents, since the lever arm 508 presents no easily-accessible grip or button with which to actuate the canister 5.

Figure 7:
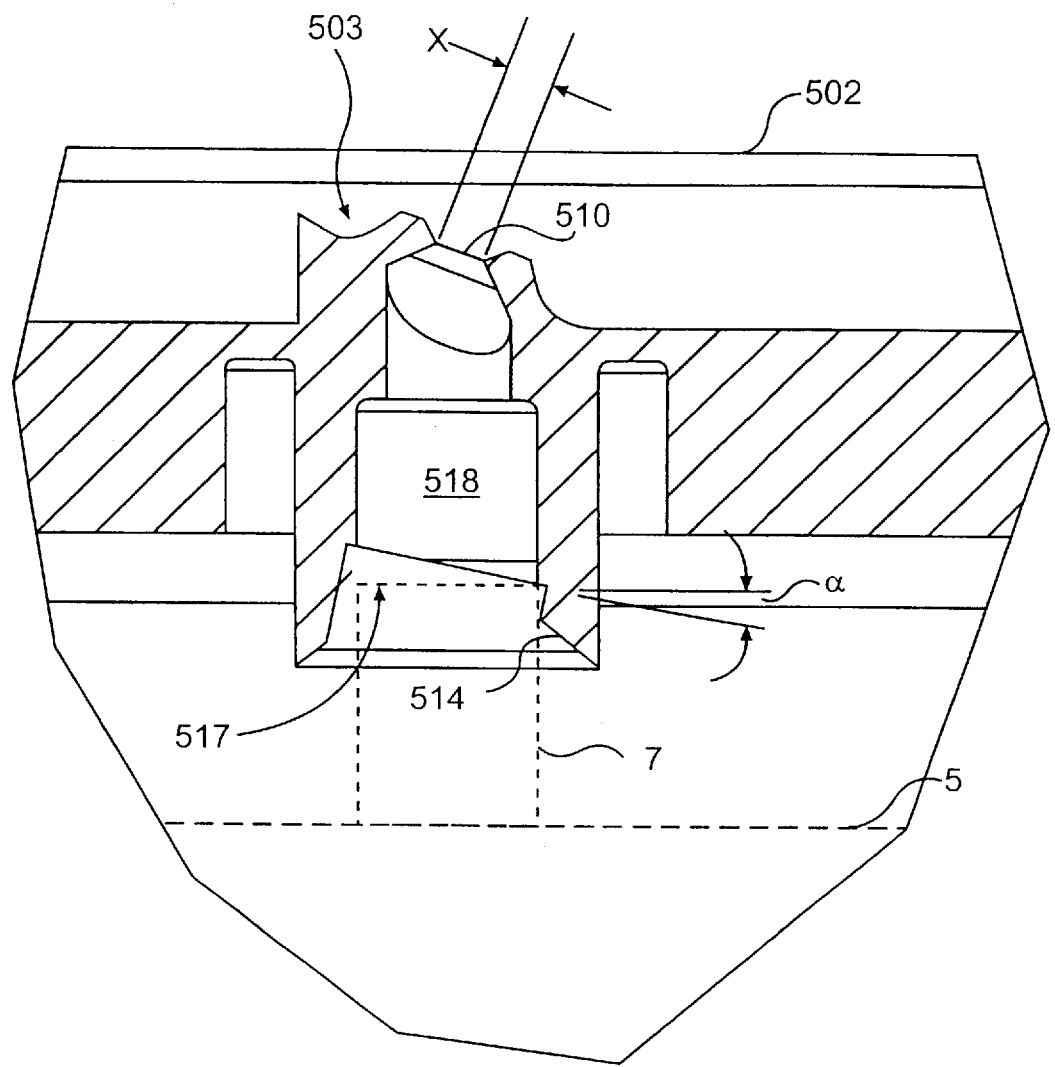
FIG. 7 is a detailed view of area A in FIG. 6.
Figure 8:
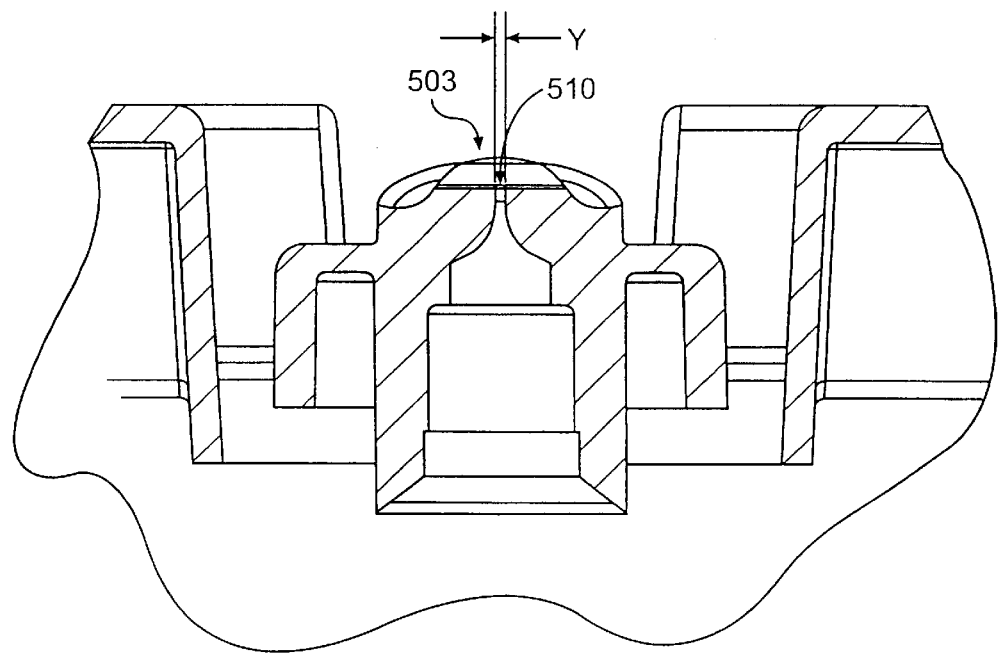
FIG. 8 is a partial sectional view taken along lines 8—8 in FIG. 3, showing a nozzle.

As shown in FIGS. 7 (a detailed view of area A of FIG. 6) and 8 (a partial sectional view taken along line 8—8 of FIG. 3), the nozzle 503 of the overcap 500 is adapted to provide a fan-shaped spray at a predetermined angle as measured from the top surface 502. This angle may be between 40° and 90°, preferably between 70° and 85°, and more preferably 78.5°. An opening 510 is tilted with respect to the top surface 502 to achieve the angled spray, as evident in FIG. 7. To achieve a fan-shaped spray, the opening 510 is wider in a first direction than it is in a second direction, where the first direction is substantially orthogonal to the second direction. In particular, the width x of the opening 510 shown in FIG. 7 is greater than the width y shown in FIG. 8. This results in a spray that is wider in a direction perpendicular to a length of the lever arm 508 than in a direction parallel with the length of the lever arm 508. Of course, the spray may be rotated in any direction so that its width points in any direction without departing from the scope of the invention.

As shown in FIG. 7, the end of the nozzle 503 nearest the canister 5, which makes up a stem socket, comprises a chamfered opening 514 leading into a tilted undercut 517. A cylindrical cavity 518, which is integral with and beyond the undercut 517 of the stem socket, is configured so as to have an inner diameter smaller than an outer diameter of the valve stem 7 of the canister 5, thus acting as a stop for the valve stem 7 and preventing the valve stem 7 from entering the cylindrical cavity 518. The tilted undercut 517 is preferably tilted at an angle of about 5°, although other angles may also be used, to effect a sealing engagement between the tilted undercut 517 and a top portion of the valve stem 7 when the lever arm 508 is actuated, i.e., depressed downward relative to the top surface 502.

Figure 9:
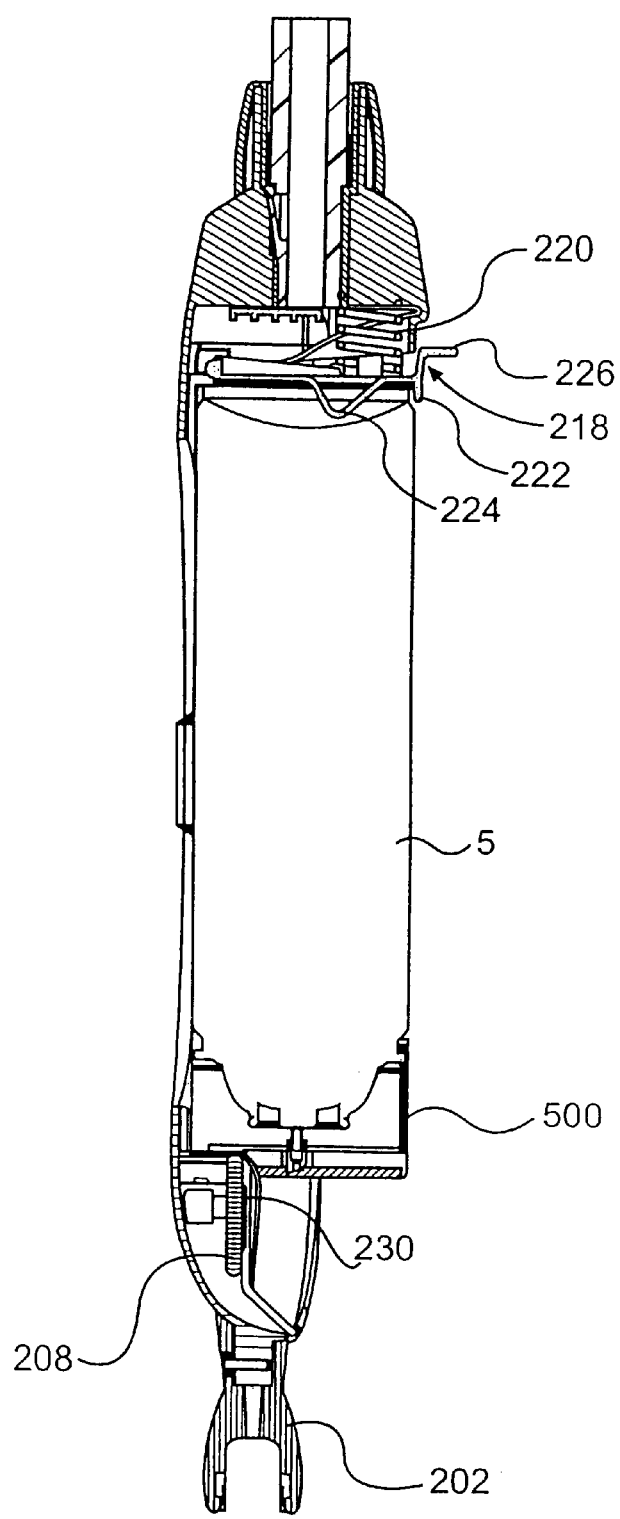
FIG. 9 is a sectional view of the housing of this invention holding the canister.

As illustrated in FIGS. 2, 5, and 9, the housing 200 retains the canister 5/overcap 500 assembly using a retainer 218 and the aligning protrusion 232. The aligning protrusion 232 acts not only to provide for a proper orientation of the overcap 500, but also acts as a support, e.g., a "pin-like" support, to retain the overcap end of the canister 5/overcap 500 assembly in the housing 200. The canister end of the canister 5/overcap 500 assembly is retained in the housing 200 by the retainer 218. The retainer 218 is spring-biased against the canister 5 by a spring 220 and retains the canister 5 by a friction force between the retainer 218 and the canister bottom. In addition, the retainer 218 includes a lip 222 along its outer periphery, as shown in FIG. 2, that contacts an outer surface of the canister 5 and prevents the canister 5/overcap 500 assembly from dislodging or "falling out" of the housing 200. The retainer 218 further includes an abutment 224 protruding from a surface of the retainer 218, which contacts a bottom surface of the canister 5 to also prevent the canister 5/overcap 500 assembly from freely releasing or "falling out" of the housing 200. As shown in FIG. 9, the retainer 218 preferably includes a tongue or handle 226, so that the retainer 218 can be easily biased against the spring 220 by a user to remove the canister 5 from the housing 200.

To install the canister 5/overcap 500 assembly into the housing 200, a user first inserts the overcap end of the canister 5/overcap 500 assembly into the housing 200, causing the D-shaped recess 506 to matingly receive the aligning protrusion 232. In this position, the D-shaped recess 506 of the overcap 500 rests on the aligning protrusion 232. Then, the user presses the canister end of the canister 5/overcap 500 assembly into the housing 200 until the retainer 218 fittingly engages the canister end of the canister 5/overcap 500 assembly.

Alternative means for holding the canister end of the canister 5/overcap 500 assembly are also contemplated, and the retainer 218 may be omitted without departing from the scope of the invention. For example, a clip may be integrally formed in the front panel 204, allowing the canister 5 to snap into the housing 200. In addition, an elastic strap may hold the canister 5 to the housing 200. Variations of the retainer 218 as shown may also be used, such as a retainer 218 without any or all of the abutment 224, handle 226, and lip 222.

Figure 10:
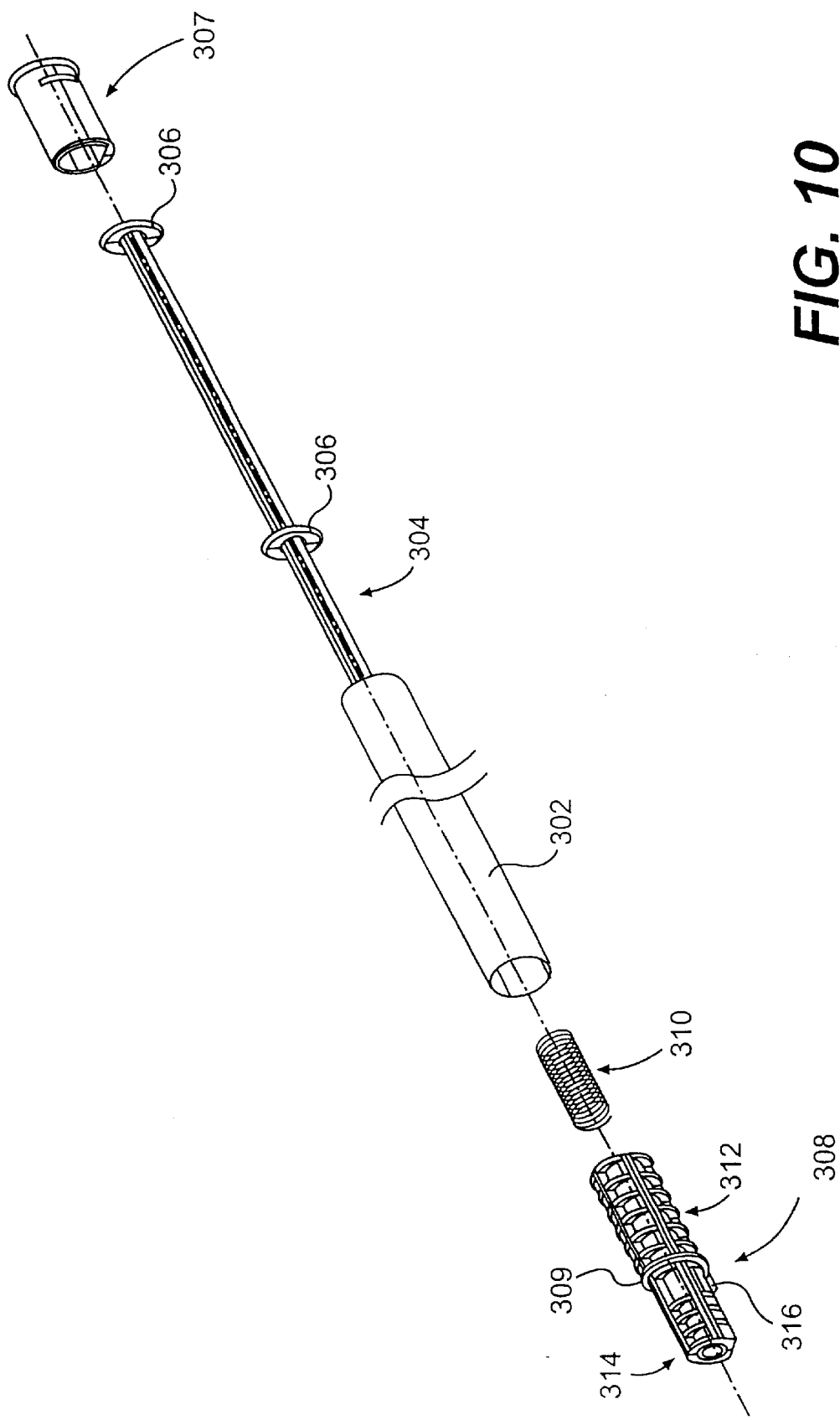
FIG. 10 is an exploded perspective view of a lower end of a shaft assembly of this invention.
Figure 11:
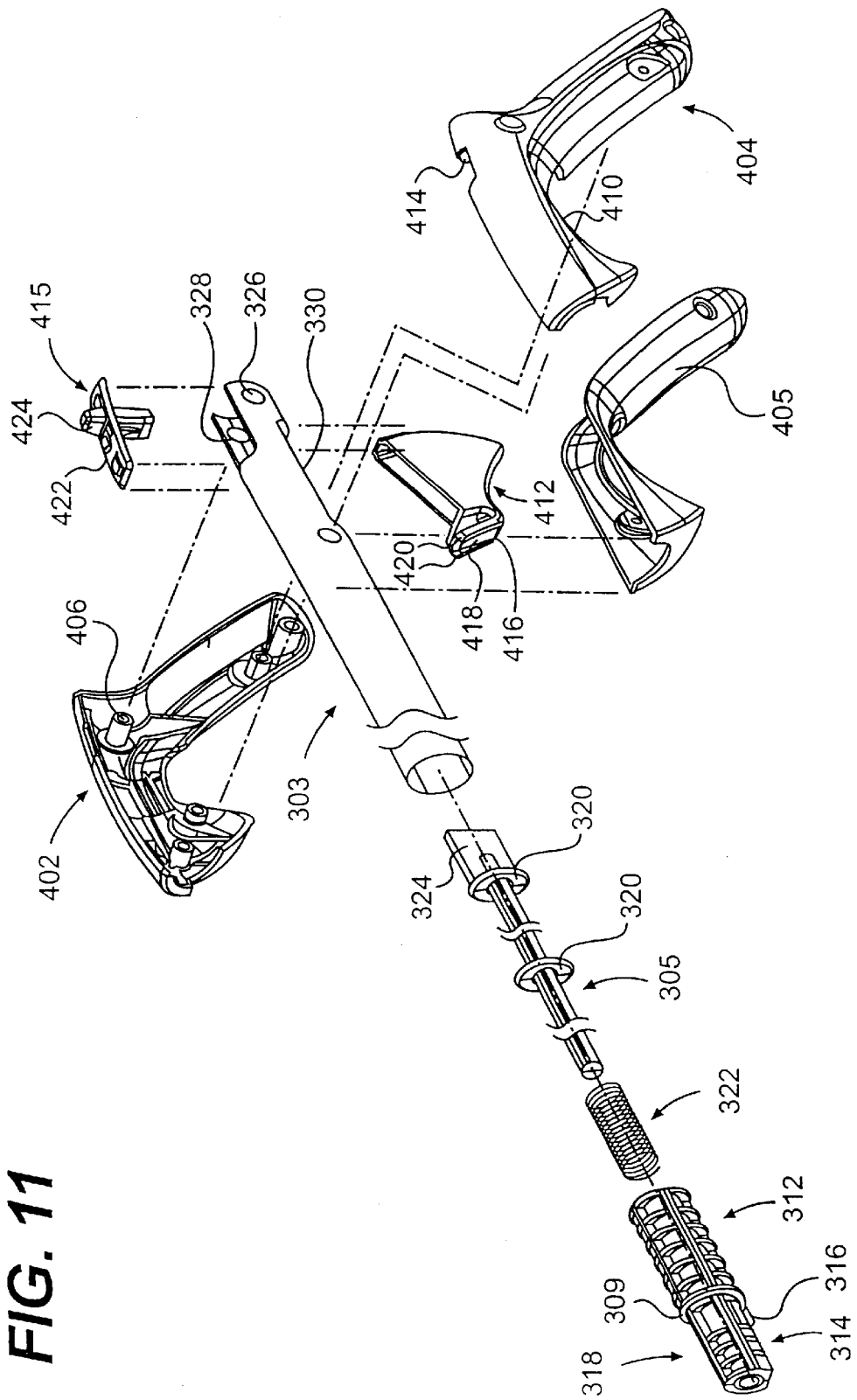
FIG. 11 is an exploded perspective view of an upper end of the shaft assembly and a handle of this invention.

Referring to FIGS. 10 and 11, the shaft assembly 300 connects, preferably in a removable manner, to the collar 219 of the housing 200, as discussed below, and comprises a lower hollow shaft 302 into which a slidable lower core 304 fits and an upper hollow shaft 303 into which a slidable upper core 305 fits. The lower core 304 has a plurality of flanges 306, which keep the lower core 304 centered in the lower hollow shaft 302. A housing plug 308 is provided at the end of the lower hollow shaft 302 nearest the housing 200, and is engaged with that end of the lower hollow shaft 302. Such engagement may be effected, by way of non-limiting examples, through a friction fit, an adhesive bond, a bond formed by thermal or ultrasonic fusion, pins, screws, crimping, or the like. At a distal end of the lower hollow shaft 302, furthest from the housing 200, is a female plug 307. The female plug 307 is also engaged, in a manner as described above with respect to the housing plug 308, with the lower hollow shaft 302. A spring 310 between one of the plurality of flanges 306 and the housing plug 308 keeps the lower core 304 biased away from the housing plug 308.

As indicated in FIG. 11, the upper hollow shaft 303 houses an upper core 305 slidably disposed therein. The upper core 305, similarly to the lower core 304, has a plurality of flanges 320. A connecting plug 318 is engaged, in a manner as described above with respect to the housing plug 308, with the upper hollow shaft 303 at a connecting end of the upper hollow shaft 303 (that is, the end nearest the lower hollow shaft 302).

The housing plug 308 and the connecting plug 318 each comprises a plurality of rings joined by longitudinal ribs, and is generally divided by a large ring 309 into an upper half 312 and a lower half 314. The upper half 312 of each of the housing plug 308 and connecting plug 318 is shaped and sized to fit snugly into each of the lower hollow shaft 302 and the upper hollow shaft 303, respectively. The lower half 314 has a bullet-shaped cross section (i.e., one flat side), ensuring that the housing plug 308 can only be inserted on one way into either the collar 219 of the housing 200 or the female plug 307. Each plug 308, 318 has a continuous, circular cavity formed therethrough, which is shaped to permit passage of the appropriate core 304, 305. The housing plug 308 and connecting plug 318 are preferably shaped slightly differently, so that the connecting plug 318 and the upper hollow shaft 303 cannot be mistakenly inserted into the housing 200.

Preferably, the lower half 314 of each plug 308, 318 has a ramped key 316, which snaps into a recess, indentation, notch, window, or the like formed in an interior wall of the collar 219 (in the case of the housing plug 308) or of the female plug 307 (in the case of the connecting plug 318). The window and ramped key mechanism secures, either permanently or removably, the housing plug 308 to the housing 200 and the connecting plug 318 to the lower hollow shaft 302.

In one example, the ramped key 316 providing for the permanent connection is a flexible, wing-like protrusion having a terminal end that flexes inwardly upon insertion into either the collar 219 or the female plug 307. The wing-like protrusion remains inwardly flexed until reaching the window, at which point the terminal end of the wing-like protrusion extends into the window, thereby creating the permanent connection.

The ramped key 316 providing for the removable connection can be a wing-like protrusion having an outwardly ramped surface integral with an inwardly ramped surface, where a peak is formed therebetween (e.g., a protrusion similar in shape to the standard keyboard character ">"). Upon insertion into either the collar 219 or the female plug 307, this wing-like protrusion remains inwardly flexed until reaching the window, at which point the peak of the wing-like protrusion extends into the window. This wing-like protrusion is rendered removable by the inwardly ramped surface, which, upon exerting a force to withdraw the lower half 314 from the collar 219 or the female plug 307, causes the wing-like protrusion to once again inwardly flex, thereby extracting the peak from the window and allowing for removal. Of course, other means of permanently or removably attaching the lower half 314 to the collar 219 or the female plug 307 may be used such as, by way of non-limiting example, fixed pins, screws, clamps, spring-loaded pins, bolts, twist-and-lock connections, and the like.

As with the lower core 304, a spring 322 biases the upper core 305 away from the connecting plug 318 by pressing against one of the flanges 320, as shown in FIG. 11. An actuating block 324 is preferably attached to the upper core 305 at the grip, or distal, end of the upper core 305. Of course, the manner of attachment may include any of those discussed above with regard to the housing plug 308.

As shown in FIG. 11, a grip end of the upper hollow shaft 303 includes a plurality of holes 326 therethrough. In addition, the upper hollow shaft 303 has a top cutout 328 and a bottom cutout 330 (where the top and bottom are defined with regard to the location of the holes 326, which defines the sides). Of course, the term "cutout" does not implicate a method of forming the cutouts, as the cutouts 328, 330 may be formed by removing material or molding the upper hollow shaft 303 with the cutouts 328, 330 formed therein. Rather, the term refers to the space in the upper hollow shaft 303.

FIG. 11 shows a handle 400 comprised of a right panel 402 and a left panel 404. Each of the right panel 402 and the left panel 404 preferably includes three protrusions 406 (two of which are long enough to extend through the holes 326 in the upper hollow shaft 303 and contact each other). The right panel 402 and the left panel 404 are secured together by screws passing through the protrusions 406 of one of the panels 402, 404 and into the protrusions 406 of the other panel 402, 404. Of course, other means to hold the right panel 402 and the left panel 404 together may be used such as, by way of non-limiting example, bolts, pressure-fit pins, adhesive, and the like, and more or fewer than three protrusions and holes may be provided. Moreover, although only a right and left panel are described, a grip insert 405, preferably formed of a soft material, may also be provided.

Each of the right and left panels 402, 404 includes a curved portion so that when the panels 402, 404 are secured together by the screws to form the handle 400, a trigger opening 410 on the bottom is formed. The trigger opening 410 receives a trigger 412 therethrough. The trigger 412 is pivotally held in position by a pin (not shown), which passes either through or into panels 402, 404 and through a hole in the trigger 412. Of course, other means for pivotally supporting the trigger 412 may be used such as, by way of non-limiting example, a bolt, a screw, a hollow tube, and the like. The trigger 412 includes a U-shaped extension or lip 416, a front face 418 of which is rectangular and has side rails 420. The rectangular front face 418 contacts the actuating block 324, and the rails 420 prevent the actuating block 324 from moving laterally. Of course, the rails need not be provided, and the front face 418 need not be rectangular. Further, any means of transforming a pivoting action into a linear action is acceptable, such as a cam and follower or a rack gear.

Each of the panels 402, 404 also includes a curved portion in its top, so that when the panels 402, 404 are secured together, a lock opening 414 is formed. The lock opening 414 receives a trigger lock 415, and includes ribs (not shown) for guiding the trigger lock 415. The trigger lock 415 includes a horizontal plate 422 and a vertical switch 424, as shown in FIG. 11. The vertical switch 424 protrudes out of the lock opening 414 above an outer surface of the handle 400, so that a user can contact the vertical switch 424 with a finger, and extends below the horizontal plate 422 into the upper hollow shaft 303. The horizontal plate 422 slides along an axis parallel to a longitudinal axis of the upper hollow shaft 303, and is guided during such sliding motion by the ribs.

When a user pushes against or pulls on the vertical switch 424, the horizontal plate 422 slides along the upper hollow shaft 303 and within the ribs of the handle 400. In a locked position, the trigger lock 415 is in its most forward position, towards the mop head 100. In an unlocked position, the trigger lock 415 is in its most rearward position, furthest from the mop head 100. In the locked position, the vertical switch 424 contacts, or nearly contacts, the trigger 412. As such, when a user attempts to squeeze the trigger 412, a top of the trigger 412 contacts the vertical switch 424, preventing further movement of the trigger 412.

An advantage of the cleaning device of this invention is its modular construction. The mop head 100, the housing 200 and the shaft assembly 300 may all be separate pieces that can be packaged separately and compactly. In the preferred embodiment, the shaft assembly 300 can be packaged in two parts, i.e., the lower hollow shaft 302 and the upper hollow shaft 303. Each of the lower hollow shaft 302 and the upper hollow shaft 303 is preferably packaged to include the plugs 308, 318, springs 310, 322 and inner cores 304, 305. The lower hollow shaft 302 preferably has the female plug 307 attached to its distal end, and the upper hollow shaft 303 preferably has the handle 400 attached to its distal end. Likewise, the housing 200 can be packaged as a complete unit to include the actuator rod 208, washer 228, spring 230, pivot link 216 and retainer 218. As such, when a user removes the cleaning device 1 from the package, the user simply snaps the lower hollow shaft 302 to the housing 200 and the upper hollow shaft 303 to the lower hollow shaft 302.

In operation, a user generally utilizes the trigger-actuated mop like any conventional mop. However, when the user desires to apply the contents of the container 5 (e.g., cleaning fluid) to the surface being cleaned, the user simply squeezes the trigger 412. At this time, the trigger 412 pivots causing the lip 416 to press against the actuating block 324, which moves the upper core 305 downward toward the mop head 100. The upper core 305 moves through the circular cavity in the connecting plug 318 past the female plug 307 and contacts the lower core 304. As a result, the lower core 304 slides through the housing plug 308 and into the housing 200. The bottom of the lower core 304 contacts the pivot link 216, causing the pivot link 216 to rotate, thereby moving the actuator rod 208 in an actuating direction toward the proximal end (i.e., in a direction substantially opposite to the sliding direction of the lower core 304). The terminal end of the bottom end 212 of the actuator rod 208 slides up through the aperture 213 in the front panel 204 and contacts the pad 509 of the lever arm 508 of the overcap 500. The lever arm 508 pivots toward the valve stem 7 on the canister 5, and the shoulder formed at the top of the cylindrical cavity 518 in the stem socket presses on the valve stem 7, opening a valve (not shown) in the canister 5 to allow projection of the contents of the canister 5 through the nozzle 503 and onto the surface to be cleaned. When the trigger 412 is released, the springs 310, 322 in the hollow shafts 302, 303, respectively, bias the cores 304, 305, respectively, upwards against the trigger 412, causing the trigger 412 to pivot back into its original, non-activated position. This action relieves the force on the actuator rod 208 and allows the spring 230 to bias the actuator rod 208 away from the overcap 500. A spring (not shown) in the valve in the canister 5 returns the valve stem 7 back to its original position, closing the valve and stopping the contents of the canister 5 from exiting the canister 5.

The components of this invention, such as the mop head 100, housing 200, shaft assembly 300, handle 400, and overcap 500, are preferably molded from plastic, such as ABS resin for its glossiness and strength. However, these molded components may also preferably be made from polypropylene, for its low cost.

While this invention has been described with reference to what are currently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A cleaning device for use with a spray canister having a cap attached thereto, said cleaning device comprising:
    a cleaning head;
    a housing connected to said cleaning head for retaining the spray canister;
    an actuator rod capable of actuating the cap to spray contents of the canister;
    a pivot link pivotally attached to said housing about a pivot point, the pivot link having a first end and a second end separated by the pivot point therebetween, the pivot point being positioned to allow contact between said actuator rod and the first end of said pivot link;
    a shaft assembly connected to said housing and including a core slidably disposed therewithin, the slidable core adapted to contact the second end of said pivot link and rotate said pivot link about the pivot point; and
    a handle attached to said shaft assembly, said handle including a trigger, wherein
        said trigger is actuated to slide the slidable core in a first direction, which in turn pivots said pivot link, bringing said actuator rod into contact with the cap.

2. A cleaning device according to claim 1, wherein said housing comprises a front panel and a back panel defining a space therebetween, and said actuator rod and said pivot link are disposed within the space defined by said front panel and said back panel.

3. A cleaning device according to claim 1, further comprising means for pivotally attaching said housing to said cleaning head.

4. A cleaning device according to claim 1, wherein said shaft assembly comprises a lower hollow shaft, an upper hollow shaft attached to said lower hollow shaft, a lower slidable core disposed within said lower hollow shaft, and an upper slidable core disposed within said upper hollow shaft, wherein said handle is attached to said upper hollow shaft, and said lower hollow shaft is attached to said housing.

5. A cleaning device according to claim 4, further comprising a first connector that attaches said upper hollow shaft to said lower hollow shaft and a second connector that attaches said lower hollow shaft to said housing.

6. A cleaning device according to claim 5, wherein said first connector and said second connector are configured to prevent said upper hollow shaft from attaching to said housing.

7. A cleaning device according to claim 1, wherein said housing comprises an alignment protrusion configured to orient the spray canister in a predetermined orientation.

8. A cleaning device according to claim 1, further comprising a biasing element configured to bias said actuator rod away from the cap.

9. A cleaning device according to claim 1, wherein said actuator rod is slidably disposed in said housing.

10. A cleaning device according to claim 1, wherein said trigger is adapted to push on the slidable core.

11. A cleaning device according to claim 1, wherein said pivot link and said actuator rod cooperate to contact only the cap of the canister.

12. A cleaning device according to claim 1, wherein said housing comprises a spring-biased retainer adapted to retain the canister in said housing.

13. A cleaning device according to claim 1, wherein said actuator rod slides in a direction substantially opposite to the first sliding direction of the slidable core.

14. A cleaning device for use with a spray canister having a cap attached thereto, said cleaning device comprising:
    a cleaning head for holding a cleaning device;
    a housing connected to said cleaning head and configured to retain the spray canister;
    an actuator rod slidably supported in said housing and configured to apply a force to the cap;
    means for reversing a direction of an applied force;
    a shaft assembly connected to said housing and including a slidable inner core for applying a force; and
    an actuator for actuating said inner core, wherein
        said means for reversing a direction of an applied force is disposed between said actuator rod and said actuator and causes said actuator rod to apply force in a direction substantially opposite to the force applied by said inner core.

15. A cleaning device according to claim 14, wherein said housing comprises a front panel and a back panel defining a space therebetween, and said actuator rod and said means for reversing a direction of an applied force are disposed within the space defined by said front panel and said back panel.

16. A cleaning device according to claim 14, wherein said means for reversing a direction of an applied force is a pivot link pivotally attached to said housing about a pivot point, the pivot link having a first end and a second end separated by the pivot point therebetween, the pivot point being positioned to allow contact between said actuator rod and the first end of said pivot link and between said slidable inner core and the second end of said pivot link.

17. A cleaning device for use with a spray canister having a valve stem, said cleaning device comprising:
- a cleaning head;
- a housing connected to said cleaning head for retaining the spray canister;
- a cap attached to the spray canister, said cap comprising a cylindrical wall, a lever arm hingedly attached to said cylindrical wall, and a nozzle disposed within said lever arm, said nozzle including a stem socket adapted to receive the valve stem of the spray canister;
- an actuator rod for contacting the cap;
- a pivot link pivotally attached to said housing about a pivot point, the pivot point being positioned to allow contact between said actuator rod and said pivot link;
- a shaft assembly including a core slidably disposed within said shaft assembly, said slidable core adapted to rotate said pivot link about the pivot point; and
- a handle attached to said shaft assembly, said handle including a trigger, wherein
   - said trigger is actuated to slide the slidable core in a first direction, which in turn pivots said pivot link and brings said actuator rod into contact with said cap.

18. A cleaning device according to claim 17, wherein said housing comprises an alignment protrusion, and said cap further comprises a recess for receiving said alignment protrusion, whereby said cap is received in said housing in a correct orientation.

19. A cleaning device according to claim 17, wherein said actuator rod slides in a direction substantially opposite to the first sliding direction of the slidable core.

20. A cleaning device according to claim 17, wherein said nozzle is adapted to provide a fan-shaped spray.

21. An actuating apparatus for use with a spray canister, said actuating apparatus comprising:
- a housing comprising a front panel and a back panel defining a space therebetween, said housing adapted to retain the canister;
- an actuator rod slidably disposed within the space between said front panel and said back panel;
- a pivot link pivotally attached to said housing about a pivot point, the pivot point being positioned to allow contact between said actuator rod and said pivot link;
- a hollow shaft assembly including an inner core slidably disposed within said hollow shaft assembly, the slidable core adapted to rotate said pivot link about the pivot point; and
- a handle attached to said hollow shaft assembly, said handle including a trigger, wherein
   - said trigger is actuated to slide the slidable core in a first direction, which in turn pivots said pivot link and in turn slides said actuator rod within said housing.

22. An actuating apparatus according to claim 21, wherein said shaft assembly comprises a lower hollow shaft, an upper hollow shaft attached to said lower hollow shaft, a lower slidable core disposed within said lower hollow shaft, and an upper slidable core disposed within said upper hollow shaft, wherein said handle is attached to said upper hollow shaft and said lower hollow shaft is attached to said housing.

23. An actuating apparatus according to claim 22, further comprising means for attaching said upper hollow shaft to said lower hollow shaft and means for attaching said lower hollow shaft to said housing.

24. An actuating apparatus according to claim 23, wherein said means for attaching said upper hollow shaft to said lower hollow shaft and means for attaching said lower hollow shaft to said housing are configured to prevent said upper hollow shaft from attaching to said housing.

25. An actuating apparatus according to claim 21, wherein said actuator rod slides in a direction substantially opposite to the first sliding direction of the slidable core.

\* \* \* \* \*